US011539794B1

(12) United States Patent
Weber et al.

(10) Patent No.: US 11,539,794 B1
(45) Date of Patent: Dec. 27, 2022

(54) SYSTEM AND METHOD FOR MONITORING DOOR USAGE

(71) Applicant: PEDS, LLC, Billings, MT (US)

(72) Inventors: E. Janee Williams Weber, Columbus, MT (US); Trent J. Eckerdt, Powell, WY (US)

(73) Assignees: TD IP HOLDCO, LLC, Waterford, MI (US); PEDS, LLC, Billings, MT (US)

( * ) Notice: Subject to any disclaimer, the term of this patent is extended or adjusted under 35 U.S.C. 154(b) by 228 days.

(21) Appl. No.: 16/416,065

(22) Filed: May 17, 2019

Related U.S. Application Data

(60) Provisional application No. 62/673,052, filed on May 17, 2018.

(51) Int. Cl.
*H04L 67/12* (2022.01)
*H04L 67/145* (2022.01)
*H04L 9/40* (2022.01)
*H04L 12/28* (2006.01)

(52) U.S. Cl.
CPC .............. *H04L 67/12* (2013.01); *H04L 63/08* (2013.01); *H04L 67/145* (2013.01); *H04L 12/2854* (2013.01); *H04L 63/029* (2013.01)

(58) Field of Classification Search
CPC ..... H04L 63/02; H04L 63/1416; H04L 63/20; H04L 12/2801; H04L 67/125; H04L 63/0218; H04L 63/0236; H04L 63/1425; H04L 67/025
See application file for complete search history.

(56) References Cited

U.S. PATENT DOCUMENTS

| | | | | |
|---|---|---|---|---|
| 7,747,724 | B2* | 6/2010 | Wallis | H04L 67/16 709/223 |
| 10,122,600 | B1* | 11/2018 | Hutz | H04L 69/04 |
| 2003/0196087 | A1* | 10/2003 | Stringer | G06F 21/6209 713/171 |
| 2008/0028083 | A1* | 1/2008 | Rezvani | H04L 47/263 709/229 |
| 2008/0130900 | A1* | 6/2008 | Hsieh | H04L 63/145 380/278 |
| 2016/0087941 | A1* | 3/2016 | Mudigonda | H04L 61/303 726/12 |
| 2017/0015521 | A1* | 1/2017 | Toutaoui | B66B 13/02 |
| 2017/0085539 | A1* | 3/2017 | Wishard | H04L 63/0442 |
| 2017/0092108 | A1* | 3/2017 | Trainor | G08B 23/00 |
| 2017/0186297 | A1* | 6/2017 | Brenner | H04W 4/029 |
| 2017/0323389 | A1* | 11/2017 | Vavrasek | G06N 20/00 |
| 2018/0191807 | A1* | 7/2018 | Dawes | H04L 67/12 |

* cited by examiner

*Primary Examiner* — Tonia L Dollinger
*Assistant Examiner* — Linh T. Nguyen
(74) *Attorney, Agent, or Firm* — Evan Law Group LLC

(57) ABSTRACT

A system for monitoring an automated door assembly comprises a sensor, a local area network having a firewall, and a manager. The sensor is coupled to the automated door assembly and is in communication with the local area network. The local area network and the manager are connected to the internet. The manager and the sensor are capable of communicating by a handshake protocol.

14 Claims, 4 Drawing Sheets

SYSTEM AND METHOD FOR MONITORING DOOR USAGE

BACKGROUND

The constant miniaturization of sensors combined with progressively increasing network speeds allow networked sensor systems to be used to monitor many different activities in a variety of settings. A particularly desirable application is monitoring the use of mechanical components that are subject to repeated use, such as automated doors. For example, a warehouse operator could monitor the overhead doors found in loading bays. This may be achieved by coupling a sensor to every door in the facility. Sensors may be used to determine if the doors are open or closed, which will improve security. Sensors may also be used to determine when a door suffers a mechanical malfunction. Rapidly detecting mechanical problems of the doors improves operating efficiency by reducing the wait time to begin repairs.

Sensor systems for monitoring equipment are known. Typically, one or more sensors are wired to a controller hub nearby. One or more controller hubs are connected to a local server through a local ethernet, forming a sensor network. In such a configuration, each controller hub knows how many sensors are wired to it based on how many of its plugs are filled. The controller hubs passively receive sensor data and convert that information to a data type that can be sent over the ethernet to the local server. The controller hubs do not independently collect any information, so if the network were to go down, the sensor information would not be transmitted to the local server. The local server may request a sensor poll from all of the networked controller hubs. When the local server requests a sensor poll, each controller hub responds with how many of its plugs are filled, and the server can determine from that number how many of the sensors are still active.

SUMMARY

In a first aspect, the invention is a system for monitoring an automated door assembly comprising a sensor, a local area network having a firewall, and a manager. The sensor is coupled to the automated door assembly and is in communication with the local area network. The local area network and the manager are connected to the internet. The manager and the sensor are capable of communicating by a handshake protocol.

In a second aspect, the invention is a system for monitoring an automated door assembly comprising a sensor and a manager. The sensor is coupled to the automated door assembly and connected to the internet. The manager is connected to the internet. The manager and the sensor are capable of communicating by a handshake protocol. The sensor is not in communication with a local area network.

In a third aspect, the invention is a method of monitoring usage of an automated door assembly with a remote device connected to the internet comprising connecting a sensor to a local area network having a firewall and connected to the internet and communicating with the sensor using a handshake protocol. The sensor has been coupled to the automated door assembly and has been assigned a unique client name.

In a fourth aspect, the invention is a computer program product comprising a computer readable medium having a computer readable program code embodied therein, the computer readable program code adapted to be executed to implement a method for processing keep-alive information received from a sensor using a handshake protocol, the method comprising: receiving a keep-alive notification from the sensor; recording the keep-alive notification in a keep-alive database; displaying an indication that the keep-alive notification was received to a user; and, optionally, sending an alert to the user if the manager does not receive additional keep-alive notifications from the sensor. The sensor has been authenticated using the handshake protocol.

In a fifth aspect, the invention is a computer program product comprising a computer readable medium having a computer readable program code embodied therein, the computer readable program code adapted to be executed to implement a method for processing trigger event information received from a sensor using a handshake protocol, the method comprising: receiving a trigger event count from the sensor; sending a trigger event response to the sensor; recording the trigger event count in a trigger event database; displaying an indication of the trigger event count to a user; and, optionally, sending an alert to the user if the trigger event count indicates that intervention or maintenance is required. The sensor has been authenticated using the handshake protocol.

Definitions

The term "automated door assembly" refers to all of the components that together open and close an automated door. An automated door assembly may include, for example, the automated door, a motorized door opener, door controllers such as remote controls, receivers and switches, the door track, the rollers coupled to the door that travel along the track and one or more springs.

The term "trigger event" means an action that is detected by a sensor. For example, each use of an automated door may be a trigger event.

The term "predictive maintenance" means maintenance that is performed on a device based on the usage history of the device.

The terms "server" and "manager" are used interchangeably and mean a device that communicates with a client, such as a sensor.

DETAILED DESCRIPTION

Figure 1:
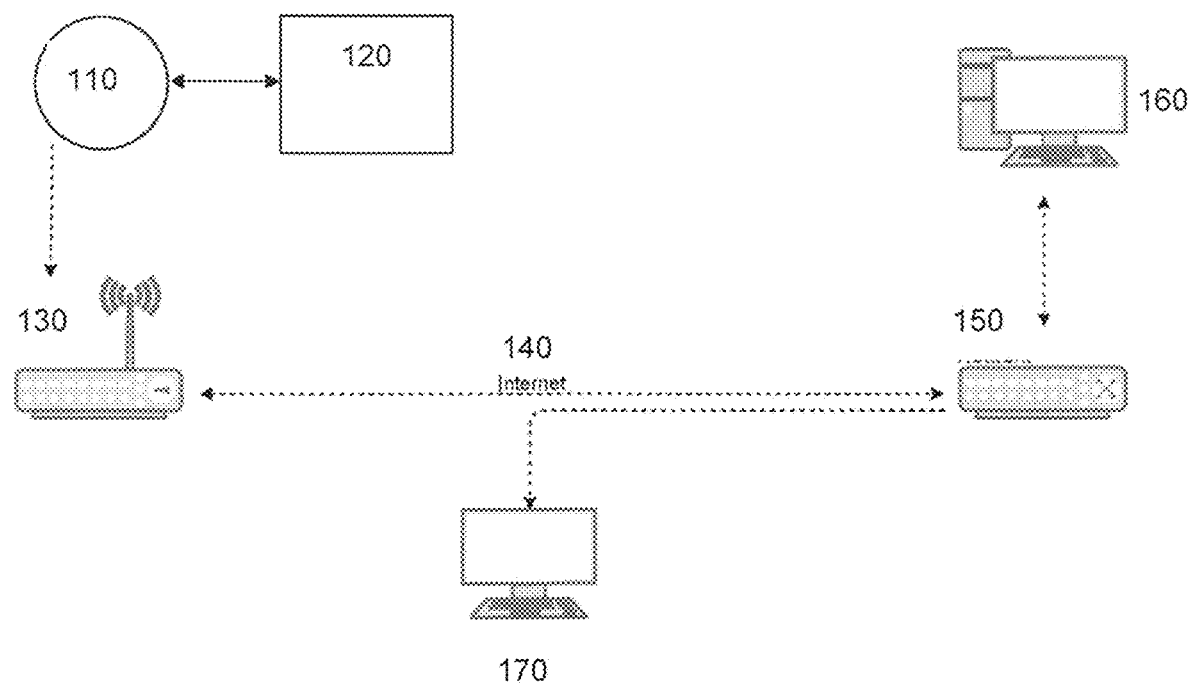
FIG. 1 illustrates a door monitoring system.

The sensor system described above suffers from a number of limitations. Since the sensor network operates on a local ethernet, remote monitoring is not possible. As a result, the data provided by the sensors can only be received and monitored locally. Remote monitoring could be achieved by connecting the sensors and/or controller hubs to a remote manager or server over the internet. However, the use of a remote monitoring device requires a special administrative setup to give the remote manager or server constant direct access to the network. Using a remote manager or server also requires opening ports on the local network's firewall, which creates security risks. Transmitting information to a remote location creates additional security risks by providing an option for third parties to intercept the data being transmitted. A common method of protecting data from being misused by an interceptor is encrypting the data prior to transmission, which also requires that the remote manager or server possess corresponding decoding information. Encryption thus adds complexity and cost to remote monitoring.

Another limitation of the sensor system described above is the minimal communication between the sensors, controller hubs and the server. Although the controller hubs are able to send sensor plug information and sensor data to the server, the controller hubs are unable to determine if the server ever receives the information. In addition, there is no way to determine whether the server is connected to the sensors.

The present invention includes a system and method for monitoring door usage using sensors that provides additional security and improved monitoring capabilities. One or more sensors may be coupled to an automated door assembly to monitor the activity of the automated door assembly. The sensors are connected to the internet, which allows for remote monitoring. The sensors can communicate securely with remote devices, such as a remote manager or a remote monitoring device, over the internet using a digital handshake. The sensors transmit data packets containing sensor identifying information, sensor status information and the number of trigger events to the remote devices. The sensor system is scalable and a single remote manager may monitor a number of separate facilities that have sensors monitoring various activities.

The sensor system includes a number of features that improve the security of the communication between the remote devices and the sensors. The digital handshake is a form of communication that does not require access through the local network firewall. In addition, the digital handshake does not require any special administrative setup of the sensor or the local network. Another security improvement is found in the data being transmitted: the data sent by the sensors is intentionally minimal and does not include information that would allow third parties to determine details of the sensor network, such as geographic location information. Since the minimal data provides information that is only useful to the remote devices that are familiar with the sensor and know how to interpret the data sent by the sensor, there is no need for encryption.

The sensor system also includes features that provide improved monitoring capabilities as compared to conventional systems. Unlike conventional sensors that only collect and transmit data, the sensors of the present invention are also capable of storing the collected data. Sensors with data storage capabilities allow door usage data to be preserved during situations where electronic communication is interrupted, such as if the local network or the internet connection experiences an outage. The stored data may be transmitted to a remote device when connectivity is restored, which ensures that door usage data is not lost. The preservation of door usage data will improve the accuracy of the monitoring.

Continuously monitoring door usage allows technicians to perform predictive maintenance based on actual usage, which is more accurate than performing maintenance based on a set passage of time, as in preventative or scheduled maintenance. Technicians may compare the total trigger events to the known expected lifespan of components within the automated door assembly to determine if the components are approaching the end of their expected lifespan. Predictive maintenance ensures that the normal operation of the business is only interrupted when necessary, which reduces costs from unnecessary downtime.

FIG. 1 illustrates a door monitoring system. A sensor 110 is coupled to an automated door assembly 120. The sensor is in communication with a local area network 130. The local area network is connected to the internet 140. A server area network 160 is also connected to the internet. A manager 160 is in communication with the server area network. An internet enabled device 170 is in communication with the server area network, which allows the internet enabled device to access the manager. The internet enabled device may be locally connected to the server area network, or may be remotely connected to the server area network over the internet.

The sensor may be any device that is capable of detecting trigger events, transmitting trigger events and storing a history of trigger events. The sensor is controlled by a processor, such as the RASPBERRY PI® Zero W. Means for detecting trigger events include motion sensors such as infrared (IR) sensors, magnetic sensors such as Hall effect sensors/switches, and vibration sensors such as accelerometers. Examples of suitable IR sensors include the SUNFOUNDER® obstacle avoidance sensor module and the AMOTOR® obstacle avoidance sensor module for Arduino smart car robot. Examples of suitable magnetic sensors include the SUNFOUNDER® reed switch module. Means for transmitting trigger events include wireless transmitters and cables for physically connecting the sensor to the local area network. Means for storing a history of trigger events include any suitable forms of computer data storage, such as random-access memory (RAM) or flash memory. The sensor may optionally include one or more indicators, such as light emitting diodes (LEDs). Examples of suitable indicators include CO-RODEO ultra bright 5 mm green or yellow LEDs and UXCELL® round head super bright red LEDs. The sensor may include a resistor, such as the E-PROJECTS® 270 Ohm ¼ W 5% resistor. The sensor may be protected by a housing, such a plastic housing. The housing may be prepared by additive manufacturing (also known as 3D printing). Examples of suitable materials for additive manufacturing include eSUN® 3D 1.75 mm PETG black filament. The sensor receives power from the facility where it is installed. The sensor may optionally include a backup power source, such as a battery.

The sensor may be coupled to any portion of the automated door assembly. Each use of the door may be a trigger event that is detected by the sensor. For example, each time the door passes an IR sensor may be a trigger event. Similarly, each time a magnet on the door passes a Hall effect sensor may be a trigger event.

The use of multiple sensors coupled to a single automated door assembly can provide additional detail about the status of the automated door assembly. For example, one sensor may be mounted near the bottom of the door travel path and a second sensor may be mounted near the top of the door travel path. The two sensors will detect two separate trigger events, which may be interpreted by the manager as an indication that a door has been fully opened or fully closed. In addition, the use of multiple sensors acts as a backup to ensure that door usage is still being monitored if one sensor experiences a malfunction. The manager may interpret the absence of sensor data from one of multiple sensors coupled to a door as an indication that a technician needs to visit the site to inspect the sensors.

The sensor may be in communication with a local area network. The sensor may be physically connected to the local area network using cables, such as ethernet cables, or may be wirelessly connected to the local area network, such as by using Wi-Fi technology. The local area network may include various networking hardware, such as gateways, routers, modems, hubs, switches, bridges, repeaters and repeater hubs. The local area network is connected to the internet, which allows the sensor to also access the internet.

The local area network preferably includes a firewall for security. The firewall prevents unauthorized access to the local area network and to the sensors. Any suitable type of firewall may be used, such as a packet-filtering firewall, a stateful inspection firewall, a circuit-level gateway, an application-level gateway (also known as a proxy firewall) or a next-generation firewall. The firewall may be network-based or host-based.

In an alternative configuration, the sensor may be connected to the internet without being connected to a local area network. The local area network (shown as element 130 in FIG. 1) may be replaced by a device that connects the sensor to the internet. The sensor may be connected to the internet using cellular telephone technology, such as by using a mobile hotspot. Examples of mobile hotspots include the Verizon JETPACK® and the AT&T NIGHTHAWK®. This configuration is particularly suitable for sensors that are in locations without access to reliable high-speed internet, or locations that are too small to require a local area network. Similarly, the sensor may contain an antenna or similar means for connecting to the internet via cellular telephone towers, which would eliminate the need for any intermediate hardware to connect the sensor to the internet.

The manager controls the sensors from a remote location. The manager may be any device that is capable of communicating with the sensor, such as a desktop or laptop computer. The manager is in communication with the server area network. The manager may be physically connected to the server area network using cables, such as ethernet cables, or may be wirelessly connected to the server area network, such as by using Wi-Fi technology. The server area network may include various networking hardware, such as gateways, routers, modems, hubs, switches, bridges, repeaters and repeater hubs. The server area network is connected to the internet, which allows the manager to also access the internet.

The manager preferably has a static internet protocol (IP) address. A static IP address does not change, which simplifies the process of connecting sensors to the manger. It also facilitates the use of a single manager to monitor multiple sensors in different locations.

The internet enabled device may be any device that is capable of connecting to the internet and interacting with the manager. Examples of suitable internet enabled devices include desktop and laptop computers, cellular phones and tablets. The internet enabled device may access the internet using wired methods, such as dial-up or broadband access, or using wireless methods, such as Wi-Fi, satellite, or cellular telephone technology.

The internet enabled device may view the raw data from the sensor that is stored on the server area network. Alternatively, the internet enabled device may interact with the manager through a software application or app.

The manager is capable of communicating with the sensor using a handshake protocol. The handshake protocol is an authorization management system controlled by the manager that forms a temporary secure tunnel or channel that allows for secure transmission of information over the internet. The manager is always available to receive incoming data, but only data sent by a sensor that has been authorized using the handshake protocol will be accepted. The handshake protocol may be any process that allows the manager to communicate securely with the sensor through the firewall. It is not necessary to open ports on the firewall when communicating using a handshake protocol. It is also not necessary to provide users of the manager or the internet enabled device with administrative access to the local area network, or to perform other special administrative setup processes to communicate using a handshake protocol.

Figure 2:
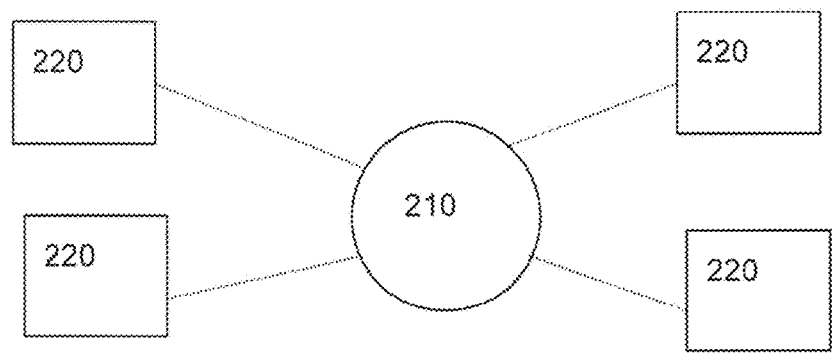
FIG. 2 illustrates a multi-facility door monitoring network.

Multiple individual door monitoring systems may be monitored by a single manager. FIG. 2 illustrates a multi-facility door monitoring network. A single manager 210 is in communication with a plurality of sensors 220 located in different physical locations. The single manager may communicate with the sensors over the internet as described above (see FIG. 1 for greater detail). A door monitoring network is scalable and additional sensors and sensor locations may be easily monitored by the single manager.

Figure 3:
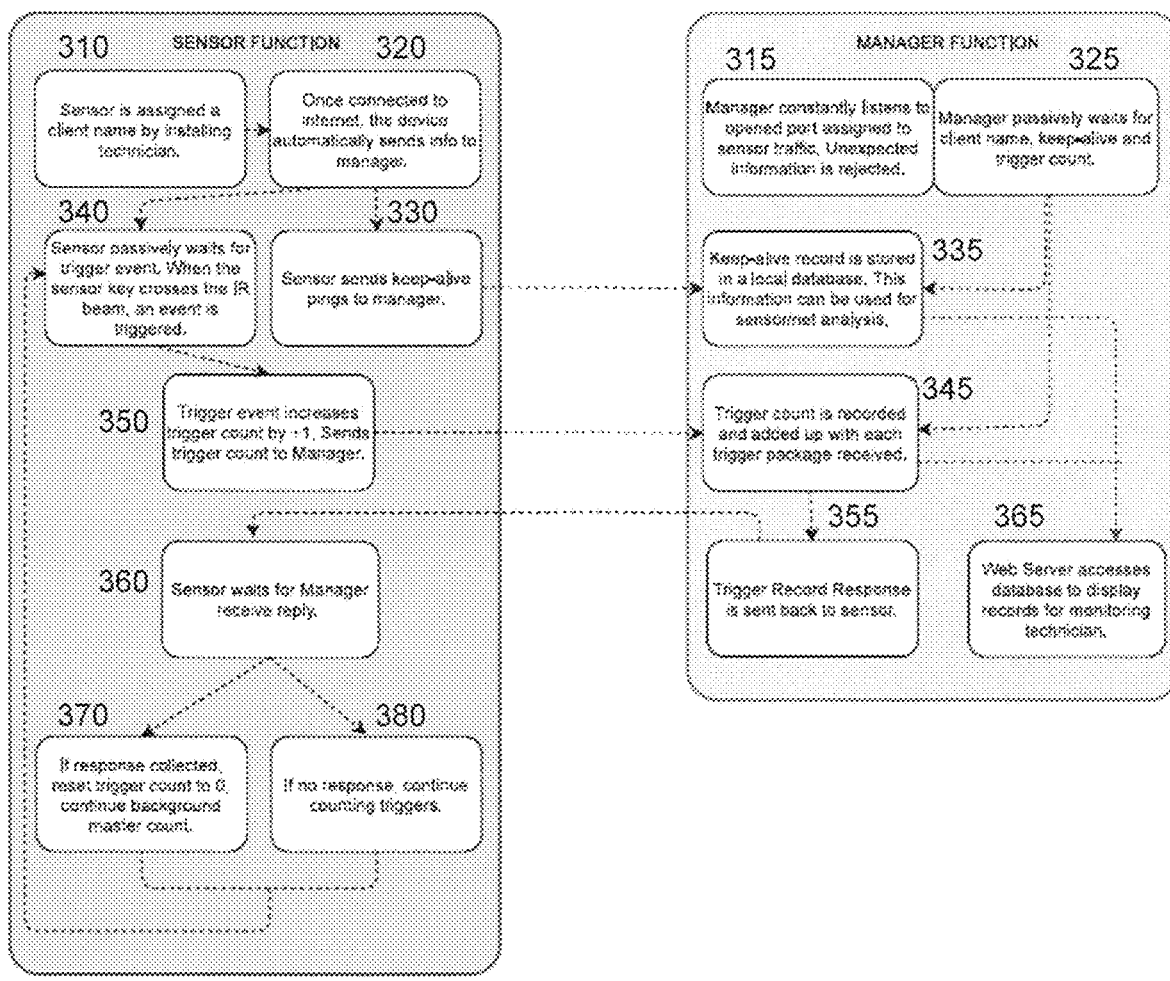
FIG. 3 illustrates the communication process between a sensor and a manager.

FIG. 3 illustrates the communication process between the sensor and the manager. First, the sensor is assigned a client name by an installing technician at 310. The sensor is then connected to the internet so that it may communicate with the manager at 320. The manager is also connected to the internet and constantly listens to opened ports assigned to sensor traffic at 315. The manager passively waits to receive sensor information such as client name, keep-alive notifications and trigger event counts at 325. The sensor periodically sends keep-alive notification pings to the manager using a handshake protocol at 330. The manager receives the keep-alive notification via the handshake protocol and records the keep-alive notification in a keep-alive database at 335. The sensor passively waits to receive trigger events at 340. When a trigger event occurs, the sensor increases the trigger event count by +1 and sends a trigger event count to the manager using a handshake protocol at 350. The manager receives the trigger event count via the handshake protocol and records the trigger event count in a trigger event database at 345. The manager then sends a trigger record response back to the sensor using a handshake protocol at 355. The sensor passively waits to receive the trigger record response at 360. If a trigger record response is received, the trigger event count is reset to 0 at 370. If no trigger record response is received, the trigger event count remains at +1 at 380. After step 370 or 380 has been completed, the process returns to step 340 and the sensor passively waits to receive an additional trigger event. A monitoring technician may monitor the keep-alive database and the trigger event database at 365. The monitoring technician may monitor the databases locally, or may monitor the databases remotely through the internet.

The sensor client name assigned by the installing technician is a unique identifier for each sensor. The unique identifier may be an alphanumeric identifier or a numeric identifier. The use of a unique identifier allows the manager to determine the source of each packet without having the sensors transmit geographic location information. Unique identifiers can thus both simplify the data transmission process and improve the security of the sensor network.

The keep-alive notification communication (also referred to as a "ping") between the sensor and the manager is a one-way communication that provides information on the operational status of the door monitoring system. The keep-alive notification communication is transmitted using a handshake protocol, which allows the manager to authenticate the sensor and identify the source of the keep-alive notification. Information received by the manager without the use of a handshake protocol is rejected. The periodic keep-alive notifications sent by the senor indicate that the sensor is operational and is connected to the internet. The keep-alive notifications allow the manager to know if the sensor is active without accessing the sensor or requesting information from the sensor. The keep-alive notifications contain minimal information, such as the sensor client name and an indicator that the sensor is operational. The keep-alive notifications preferably do not include information that would allow third parties to determine the identity of the sensor, such as a geographic location information.

The manager maintains a database of all keep-alive notifications and records each keep-alive notification. The keep-alive notifications may receive a time-stamp or other similar records management information added by the manager. The manager may be configured to alert a technician or the facility owner if a keep-alive notification has not been received after a set amount of time, since this is an indication that the sensor or the internet connection is experiencing technical difficulties. For example, the manager may send an alert if no keep-alive notification has been received in the past 60 minutes, or in the past 24 hours. Similarly, the manager may be configured to alert a technician if the number of keep-alive notifications received over a given amount of time is below a predetermined threshold, since this is an indication that the sensor or the internet connection is experiencing connectivity issues. For example, the manager may send an alert if it has received fewer than 28 keep-alive notifications over a seven-day period.

Figure 4:
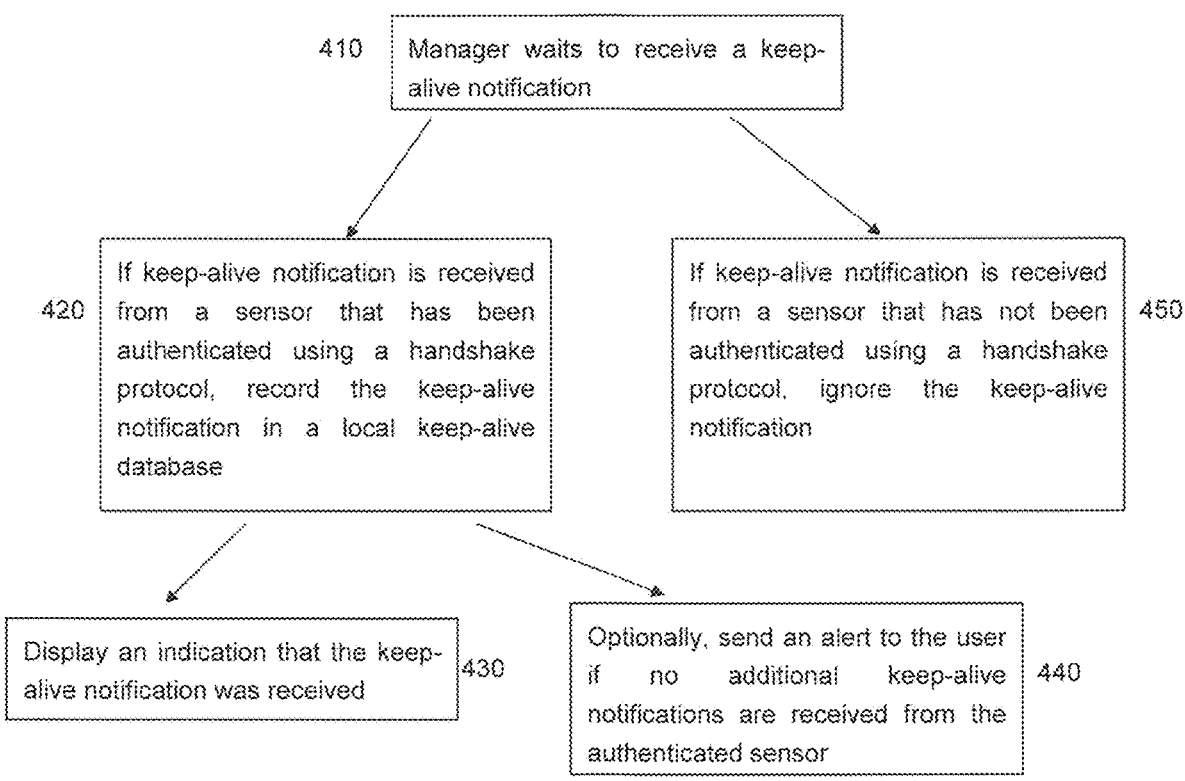
FIG. 4 illustrates a flow chart showing the processing of keep-alive information that a manager receives from a sensor.

FIG. 4 illustrates a flow chart showing the processing of keep-alive information that a manager receives from a sensor. The manager passively waits to receive a keep-alive notification from the sensor at 410. If the manager receives a keep-alive notification from a sensor that has been authenticated using a handshake protocol, the manager records the keep-alive notification in a keep-alive database at 420. The manager then displays an indication that the keep-alive notification was received to a user at 430. The manager may optionally send an alert to the user if the manager does not receive additional keep-alive notifications from the authenticated sensor at 440. If the manager receives a keep-alive notification from a sensor that has not been authenticated using a handshake protocol, the manager ignores the keep-alive notification at 450. The process illustrated in FIG. 4 may be carried out by a computer program stored in the memory of the manager.

The trigger event count communication (also referred to as a "packet") between the sensor and the manager is a one-way communication that provides information on the usage of the automated door assembly, and that is answered with an acknowledgment from the manager. The sensor records each trigger event in a means for storing a history of trigger events by increasing its trigger event count by +1, and sends each trigger event count to the manager. The trigger event count communication contains minimal information, such as the sensor client name and the trigger event count. The trigger event counts preferably do not include information that would allow third parties to determine the identity of the sensor, such as a geographic location information.

The manager maintains a database of all trigger events and records all trigger event counts. The trigger events may receive a time-stamp or other similar records management information added by the manager. The manager also sends a trigger record response back to the sensor after receiving each trigger event count. If the sensor receives the trigger record response, the sensor resets its trigger event count to 0 and waits to receive a new trigger event, which will increase its trigger event count to +1. If the sensor does not receive the trigger record response, the sensor trigger event count is not reset and the sensor waits to receive a new trigger event, which will increase its trigger event count to +2. The sensor will continue increasing its trigger event count by +1 for each trigger event indefinitely until a trigger record response is received from the manager.

Figure 5:
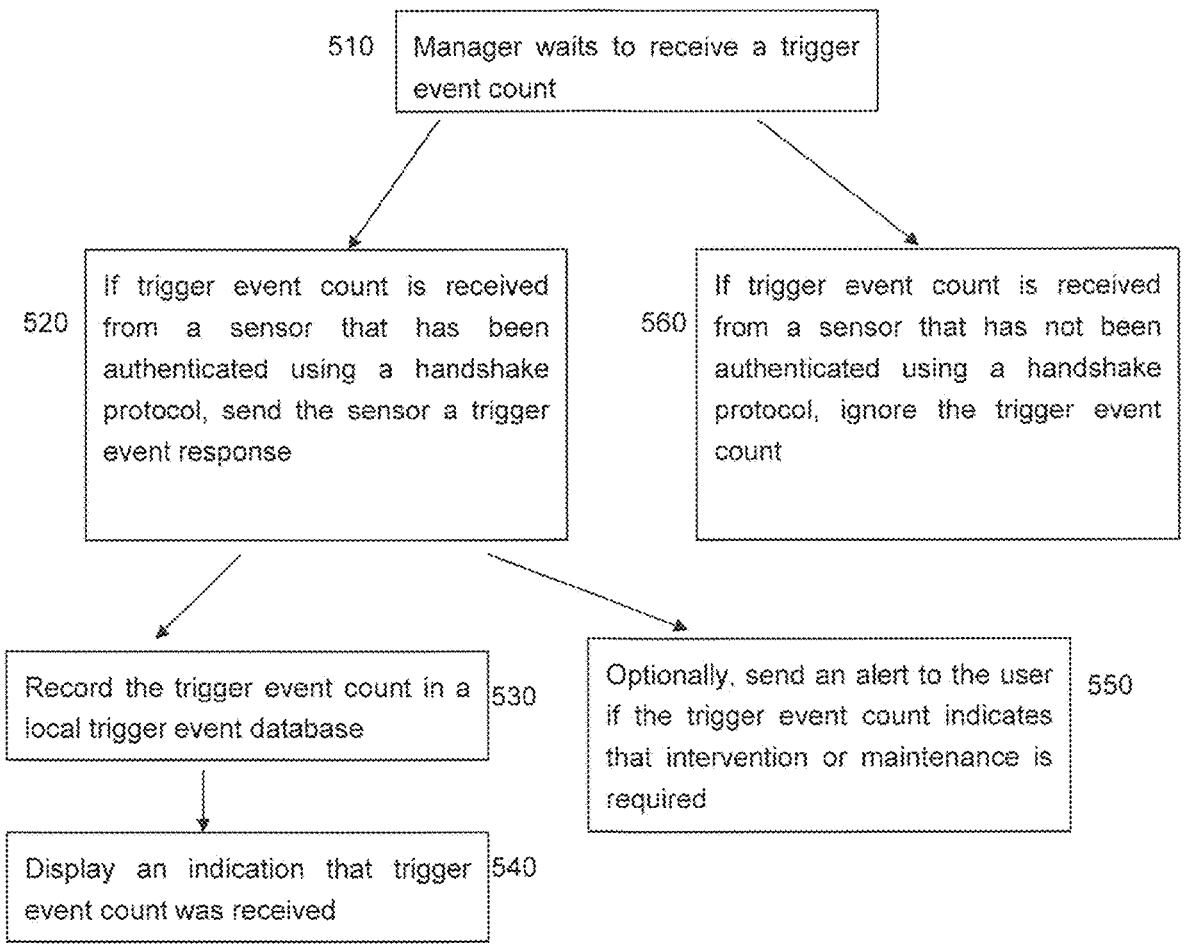
FIG. 5 illustrates a flow chart showing the processing of trigger event information that a manager receives from a sensor.

FIG. 5 illustrates a flow chart showing the processing of trigger event information that a manager receives from a sensor. The manager passively waits to receive a trigger event count from the sensor at 510. If the manager receives a trigger event count from a sensor that has been authenticated using a handshake protocol, the manager then acknowledges the trigger event count by sending the sensor a trigger event response at 520. The manager records the trigger event count in a trigger event database at 530. The manager then displays an indication of the trigger event count to a user at 540. The manager may optionally send an alert to the user if the trigger event count indicates that intervention or maintenance is required at 560. If the manager receives a trigger event count from a sensor that has not been authenticated using a handshake protocol, the manager ignores the trigger event count at 560. The process illustrated in FIG. 5 may be carried out by a computer program stored in the memory of the manager.

The manager may be configured to alert a technician or the facility owner based on the number of trigger counts received. A technician may be alerted if the trigger event count is greater than +1 since a trigger event count greater than +1 is an indication that the sensor did not receive a trigger record response from the manager for at least one prior communication. Failure to receive a trigger record response from the manager may be indicative of internet connection connectivity issues with the sensor or with the manager, or may indicate a malfunction with the sensor or the manager. Similarly, if the total number of trigger events received from a sensor is an odd number, this may be an indication that the door did not complete its last opening and closing cycle.

The manager may also be configured to alert a technician or the facility owner based on the time when trigger events are received. Since two trigger events from a single sensor are an indication that the movement of the door has been detected two times, an average door movement time may be determined. If the time between trigger events exceeds the average door movement time, this may be an indication of mechanical issues with the automated door assembly.

Similarly, the manager may be configured to alert a technician or the facility owner if a trigger event count is received outside of certain time periods. For example, an alert may be sent if a trigger event occurs before or after normal business hours, such as before 9:00 AM or after 5:00 PM, or if a trigger event occurs during non-working days, such as weekends or holidays. Trigger events that occur outside of certain time periods may be an indication of unauthorized use of the automated door assembly, such as trespassing or burglary. The manager may optionally be configured to also alert law enforcement or security in addition to alerting a technician.

The database of all trigger events recorded by the manager allows for predictive maintenance to be performed on the automated door assembly. The total number of trigger events may be compared to the known expected lifespan of components within the automated door assembly to determine whether the components are approaching the end of their expected lifespan. For example, if a motorized door opener is known to have an expected lifespan of 5,000 door opening or closing actions, a trigger event count of 4,500 indicates that the motorized door opener has reached 95% of its expected lifespan and is likely to need to be replaced soon. Similarly, a trigger event count of 5,500 indicates that the motorized door opener has exceed its expected lifespan and should be replaced as soon as possible.

The thresholds for predictive maintenance may be set by the monitoring technician based on historical usage records and the risk tolerances of the owner of the facility being monitored. For example, an automated door assembly may be identified as almost due for maintenance when the trigger event count reaches 75% of the expected lifespan of a component, due for maintenance when the trigger event count reaches 98% of the expected lifespan of a component or past due for maintenance when the trigger event count reaches 98.1% of the expected lifespan of a component. The manager may also take automatic action based on the predictive maintenance thresholds. For example, the manager may notify the facility owner or the technician when the trigger event count indicates that maintenance is recommended. Similarly, the manager may automatically schedule a technician to visit the facility when the trigger event count indicates that maintenance is due or is past due.

The manager may provide qualitative measures of predictive maintenance in addition to, or in place of, quantitative or numerical measures of predictive maintenance. Examples of qualitative measures of predictive maintenance include graphs and color-coded digital displays. For example, the color green may indicate that the trigger count of an automated door assembly is below the threshold for maintenance, the color yellow may indicate that the trigger count is approaching the threshold for maintenance, the color orange may indicate that the trigger count indicates maintenance is due and the color red may indicate that maintenance is past due. An advantage of qualitative measures of predictive maintenance is that they allow the monitoring technician to quickly and easily determine the status of multiple automated door assemblies being monitored.

The manager may send alerts or notifications using any suitable form of communication. Examples of suitable alerts or notifications include emails, text messages (SMS messages), cellular phone notifications and automated phone calls. The manager may be configured to communicate with individuals responsible for the facility, such as technicians and facility owners. The manager may optionally be configured to communicate with suppliers of the components of the automated door assembly, such as by automatically ordering a replacement component when predictive maintenance indicates that repair is necessary.

The systems and methods described above may be used to monitor any type of automated door. Overhead doors are a preferred type of door to be monitored. The doors may be commercial or residential overhead doors, such as those sold by Alpha Overhead Door of Billings, Mont. (www.alpha-overhead.com).

What is claimed is:

1. A method of monitoring usage of an automated door assembly with a remote device connected to the internet, comprising:
   connecting a sensor to a local area network having a firewall and connected to the internet; and
   communicating with the sensor using a handshake protocol;
   wherein the sensor has been coupled to the automated door assembly and has been assigned a unique client name,
   the remote device comprises a manager,
   the communicating comprises
      the manager authenticating the sensor,
      the sensor sending a keep-alive notification and/or a trigger event count to the manager, and
      the manager sending a trigger record response to the sensor, and
   the method further comprises storing a database of keep-alive notifications received from the sensor;
   storing a database of trigger event counts received from the sensor;
   sending a notification to a user;
   displaying automated door assembly usage information to the user; and
   performing predictive maintenance on the automated door assembly based on the usage of the automated door assembly.

2. The method of claim 1, wherein
   the communicating comprises the sensor sending it keep-alive notification to the manager.

3. The method of claim 1, wherein
   the communicating comprises the sensor sending the trigger event count to the manager.

4. A system for monitoring an automated door assembly, comprising:
   a sensor, coupled to the automated door assembly,
   a local area network having a firewall, connected to the internet and in communication with the sensor, and
   a manager, connected to the internet,
   wherein the manager and the sensor are capable of communicating by a handshake protocol, and
   the handshake protocol does not require open ports on the firewall.

5. The system of claim 4, further comprising a server area network, connected to the internet and in communication with the manager.

6. The system of claim 5, further comprising an internet enabled device, connected to the internet and in communication with the server area network.

7. The system of claim 6, wherein the internet enabled device is selected from a group consisting of desktop and laptop computers, cellular phones and tablet computers.

8. The system of claim 4, wherein the sensor is selected from a group consisting of a motion sensor, a magnetic sensor, and a vibration sensor.

9. The system of claim 4, wherein the sensor comprises a means for storing a history of trigger events.

10. The system of claim 4, wherein the sensor comprises a means for transmitting trigger events using the handshake protocol.

11. The system of claim 4, wherein the manager has a static internet protocol (IP) address.

12. The system of claim 4, wherein at least two sensors are coupled to the automated door assembly.

13. The system of claim 4, wherein the system comprises multiple sensors and the sensors are located in different geographic locations.

14. The system of claim 4, wherein the sensor is configured to transmit data that is not encrypted.

* * * * *

UNITED STATES PATENT AND TRADEMARK OFFICE
CERTIFICATE OF CORRECTION

| | | |
|---|---|---|
| PATENT NO. | : 11,539,794 B1 | |
| APPLICATION NO. | : 16/416065 | |
| DATED | : December 27, 2022 | |
| INVENTOR(S) | : E. Janee Williams Weber et al. | |

It is certified that error appears in the above-identified patent and that said Letters Patent is hereby corrected as shown below:

In the Claims

Column 10, Line 24, please delete "it" and insert --the--

Signed and Sealed this
Twenty-eighth Day of March, 2023

Katherine Kelly Vidal
*Director of the United States Patent and Trademark Office*